Sept. 18, 1923.                    1,468,320
                 J. S. NEUMANN
                   FISH STOP
             Filed Jan. 18, 1923          2 Sheets-Sheet 1

WITNESSES
Guy M Spring
George W. Wright

Inventor
JAKOB S. NEUMANN

By Richard B. Owen, Attorney

Sept. 18, 1923.  J. S. NEUMANN  1,468,320
FISH STOP
Filed Jan. 18, 1923  2 Sheets-Sheet 2
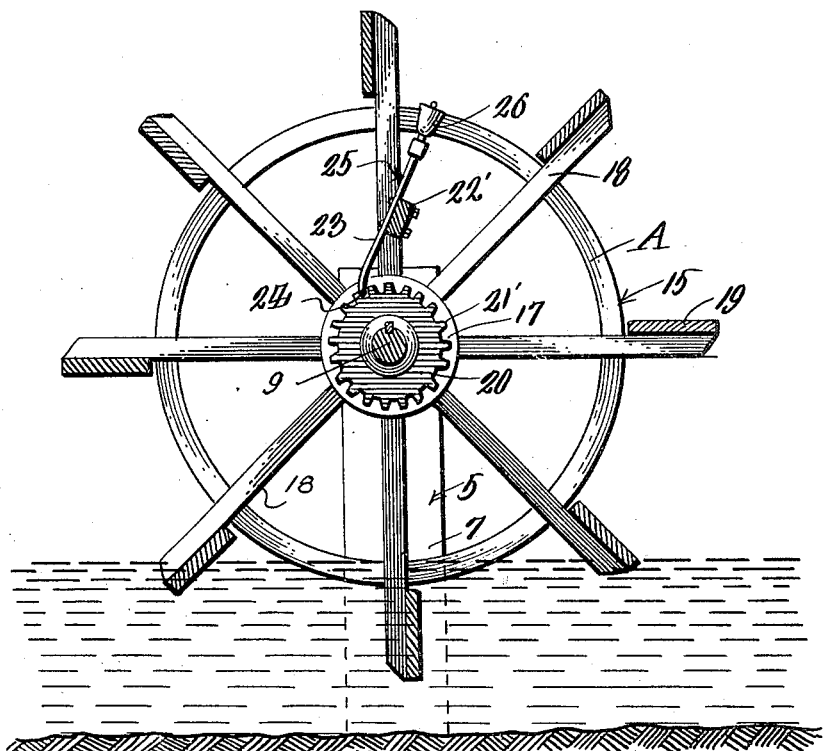
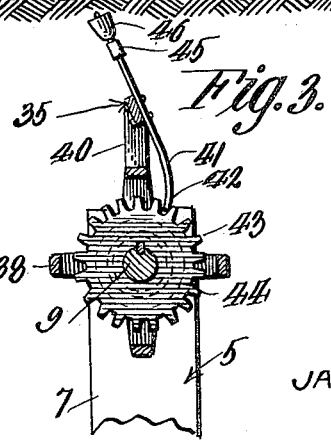
WITNESSES
Inventor
JAKOB S. NEUMANN
By Richard B. Owen
Attorney Patented Sept. 18, 1923.

1,468,320

UNITED STATES PATENT OFFICE.

JAKOB S. NEUMANN, OF GREAT FALLS, MONTANA, ASSIGNOR TO EDWARD NEUMANN, OF GREAT FALLS, MONTANA.

FISH STOP.

Application filed January 18, 1923. Serial No. 613,487.

*To all whom it may concern:*

Be it known that I, JAKOB S. NEUMANN, a citizen of the United States, residing at Great Falls, in the county of Cascade and State of Montana, have invented certain new and useful Improvements in a Fish Stop, of which the following is a specification.

This invention relates to means for preventing fishes from entering into irrigation ditches and the primary object of the invention is to provide a novel device disposed at a convenient point in a stream for sounding an alarm, thereby frightening the fishes and preventing the same from passing the device into an irrigation ditch or feeder.

A further object of the invention is to provide a novel fish stop for irrigation ditches embodying a wheel revoluble by the passage of the water past the same, and means operated by the wheels for ringing a series of bells or other noise making devices.

A still further object of the invention is to provide an improved fish stop of the above character which will be durable and efficient in use, one which will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a longitudinal section through the improved fish stop showing the same in a stream.

Figure 2 is a transverse section through the improved device taken on the line 2—2 of Figure 1.

Figure 3 is a detail transverse section taken on the line 3—3 of Figure 1.

Figure 4 is an enlarged fragmentary sectional view illustrating the means of associating a set of bells with one of the bell actuating devices.

Referring to the drawings in detail, wherein similar reference characters designate corresponding parts throughout the several views the letter A generally indicates the improved fish stop, which includes a supporting structure 5, the water wheel 15, and the alarm devices 25 and 35.

The supporting structure 5 comprises a pair of spaced posts 6 and 7, which have their lower ends embedded in the bed of a stream 8 at the desired location. The upper ends of the standards 6 and 7 support a stationary shaft 9, which can extend through the upper ends of the posts 6 and 7. One end of the shaft 9 can be keyed or otherwise secured as at 10 to the post 6 against rotation if so desired.

The water wheel 15 can be of any preferred construction and as shown includes the pair of spaced hub disks 16 and 17, the radially extending pairs of arms 18, and the paddle blades 19 carried by the outer terminals of the arms. In order to reinforce the wheel, annular brace members 21 and 22 can be secured to the outer surface of the arms 18 in facial abutment with the inner edges of the paddle blades 19.

In order to operate the set of bells 25, the shaft 9 has rigidly secured thereto in any preferred manner a wheel 20, the periphery of which is provided with a plurality of spaced teeth 21', the purpose of which, will be hereinafter more fully described. A transversely extending supporting cleat 22' is secured to one pair of the arms 18 which support a resilient arm 23 formed of spring steel or the like. The lower end of the resilient arm 23 is provided with an inturned terminal or tooth 24, which is adapted to engage the teeth 21' formed on the wheel 20. The outer end of the resilient arm 23 supports the set of bells or other noise making device 25 and as shown this device includes a plurality of bells 26, which are secured as at 27 to a transversely extending head or bar 28. As clearly shown in Figure 4 of the drawings the bell clappers 29 are secured to screw eyes 30, which are threaded into the transversely extending head or bar 28 and thus it can be seen that these screw eyes form the dual function of holding the bell clappers 29 in position and the bodies of the bells themselves in position.

It is obvious that during the rotation of the wheel 15 that the spring or resilient arm 23 will be carried therewith. Thus the tooth end 24 thereof will strike one tooth after the other thus causing the flexing of the resilient arm 23 and the ringing of the set of bells 25.

As clearly shown in Figures 1 and 3 I have provided a second set of bells 35 and actuating means therefor, which will be now described.

The means for ringing the set of bells 35 comprises a pair of spaced sleeves 36 and 37, which are mounted upon the shaft 9 and as shown the sleeve 36 has one end securely bolted to the hub disk 17 or the water wheel 15. The facing terminals of the sleeves 36 and 37 are secured to a suitable spider or hollow supporting frame 38, as at 39 and this spider or hollow supporting frame 38 carries a supporting bracket 40 to which is secured a resilient arm 41, that is similar to the resilient arm 25. The lower or inner end of this resilient arm 41 is provided with a tooth 42, which is adapted to engage the teeth 43 of a wheel 44, which is secured to the shaft 9. Thus it can be seen that the wheel 44 is held against movement and that the wheel is disposed in the open frame 38 and during the rotation of the sleeves 36 and 37 by the water wheel 15 that the arm 41 will consequently be flexed. The outer end of the arm 41 has secured thereto in any preferred manner a cross bar or head 45, to which is secured the bells 46. The bells 46 are secured in the same manner to the head or bar 45 as the bells 26 are secured to the bar or head 28.

By referring to Figure 1 of the drawings it can be seen that the sleeve 37 extends through the supporting standard 7 and if so desired a suitable sleeve 47 can be placed on the shaft 9 to form a bearing for the sleeve 37.

From the foregoing description it can be seen that an improved and simple device has been provided for automatically operating noise making devices, so as to effectively frighten fishes in a stream so as to prevent the fish from entering into irrigation ditches and the like.

It is obvious that the water wheel 15 can be utilized for doing other work, such as elevating water, operating extraneous mechanism and the like.

Changes in details may be made without departing from the spirit or scope of this invention.

What I claim as new is:—

1. A fish stop comprising a rotatable water wheel, a set of bells carried by and rotatable with the water wheel, and means for operating the set of bells during rotation of the wheel.

2. In a fish stop, a water wheel, a flexible arm carried by the water wheel, a noise making device carried by the flexible arm, and a stationary ratchet wheel for flexing said arm during the movement of the water wheel.

3. A fish stop comprising a pair of spaced standards anchored in the bed of a stream, a water wheel rotatably mounted between the standards, a stationary ratchet wheel disposed between the standards, a flexible arm carried by the water wheel arranged to engage the ratchet wheel, and a set of bells carried by the outer end of the flexible arm.

4. In a fish stop, the combination with a pair of supporting standards, a stationary shaft secured to the standards, a water wheel rotatably mounted upon the standards, a ratchet wheel secured to the shaft against movement, a resilient arm carried by the water wheel and having its inner end engaging the ratchet wheel, and a set of bells secured to the outer end of the arm.

5. In a fish stop comprising a pair of supporting standards, a shaft secured to the standards against movement, a water wheel rotatably mounted upon the shaft, a ratchet wheel keyed to the shaft, a pair of spaced sleeves rotatably mounted upon the shaft, means connecting the meeting ends of the sleeves together, means connecting one of the sleeves to the water wheel, a set of bells connected with the means for connecting the sleeves together, and a resilient arm for engaging the ratchet wheel for operating the set of bells.

In testimony whereof I affix my signature in presence of two witnesses.

JAKOB S. NEUMANN.

Witnesses:
ABRAHAM B. DIRKS,
FRANCES HAGGARTY.